United States Patent Office 3,480,392
Patented Nov. 25, 1969

3,480,392
HYDROXYLAMINE SOLUTIONS STABILIZED WITH A HYDROXAMIC ACID AND METHOD FOR THEIR PREPARATION
Donald D. Carlos, Crown Point, Ind., assignor to Sinclair Research, Inc., New York, N.Y., a corporation of Delaware
No Drawing. Filed Aug. 24, 1967, Ser. No. 662,875
Int. Cl. C01b 21/14
U.S. Cl. 23—190         14 Claims

ABSTRACT OF THE DISCLOSURE

Hydroxylamine in aqueous solution stabilized from oxidation deterioration with a hydroxamic acid present in a small amount, usually about 0.01 to 1 wt. percent based upon the aqueous solution, said hydroxamic acid having about 1 to 10 carbon atoms and a molecular weight from about 61 to 200.

---

This invention relates to stabilized hydroxylamine in aqueous solution.

Aqueous solutions containing hydroxylamine are widely used in synthesis work but the instability of the reagent greatly limits its utility in cases where storage is necessary and in reactions where product purity is important. The problem of instability of aqueous solutions containing hydroxylamine is particularly serious when these solutions are obtained by ion-exchange techniques.

It has been found that hydroxamic acids, when present in low concentrations, exhibit a remarkable inhibiting effect toward autoxidation of hydroxylamine in aqueous solution. Hydroxamic acids show a superior inhibiting effect over, for instance, the tetra-sodium salt of ethylene-diamine-tetra-acetic acid.

According to the invention, hydroxylamine in aqueous solution can be stabilized from oxidation deterioration with a hydroxamic acid. The amount of hydroxamic acid can be a small amount sufficient to inhibit oxidative deterioration of the hydroxylamine and usually is about 0.01 to 1 wt. percent or more of the aqueous solution and preferably can be about 0.05 to 0.5 wt. percent. The aqueous solution containing hydroxylamine can be produced by the reaction of a hydroxylamine hydrohalide salt in aqueous solution, such as hydroxylamine hydrochloride, with an alkali metal hydroxide, such as sodium hydroxide. Hydroxylamine hydrosulfate or any other suitable acid salt or other convenient form can also be used. The hydroxylamine is usually at least about 1 wt. percent of the aqueous solution and can be up to saturation or more, but is conveniently about 3 to 15 wt. percent.

The hydroxamic acid can have about 1 to 10 carbon atoms with a molecular weight from about 61 to 200. A suitable hydroxamic acid is benzohydroxamic acid. It is not necessary to add the hydroxamic acid in acid form. The addition of any substance capable of reacting with hydroxylamine in aqueous solution to form the hydroxamic acid will bring about stabilization of hydroxylamine. Illustrative of the types of compounds that can be used are acyl and aroylchlorides having about 1 to 10 carbon atoms such as acetyl chloride, terephthalyl chloride, and benzoyl chloride; aliphatic and aromatic carboxylic acid anhydrides having about 1 to 10 carbon atoms such as acetic anhydride and benzoyl anhydride; aliphatic and aromatic esters of carboxylic acids having about 1 to 10 carbon atoms such as methyl acetate and ethyl benzoate; and aralkyl trihalo, preferably trichloro compounds, having about 1 to 10 carbon atoms such as benzotrichloride.

The present invention will be more clearly understood from a consideration of the following examples.

EXAMPLE

A series of samples were prepared wherein hydroxylamine in aqueous solution was stabilized by the addition of an inhibiting agent. The aqueous solution containing hydroxylamine was prepared from neutralization of hydroxylamine hydrochloride in aqueous solution with sodium hydroxide. All samples were stored in capped bottles upon the bench top at room temperature. The inhibiting agent was added in an amount of 0.1 percent by weight of the sample to the various samples, each containing approximately 7.15 percent by weight of hydroxylamine.

The Raschig method for the determination of hydroxylamine was used in the present experiments. This method involves the quantitative oxidation of hydroxylamine to nitrous oxide by ferric ion in strongly acid solution. The ferrous ion so formed is determined by titration with standard permanganate.

The details and results obtained using the different inhibiting agents are given in the table below:

PERCENT HYDROXYLAMINE IN SAMPLE AT TIMES INDICATED

| Inhibiting agent | Time, Hours | | | | | | |
|---|---|---|---|---|---|---|---|
| | 0 | 4 | 30 | 54 | 78 | 438 | 702 |
| No inhibiting agent | 7.15 | 6.91 | 5.22 | 3.78 | 1.71 | 0.00 | |
| Tetra-sodium salt of ethylene-diamine-tetra-acetic acid | 7.15 | | 6.92 | 6.69 | | 3.85 | 2.42 |
| Benzohydroxamic acid | 7.15 | | 7.16 | 7.11 | 7.05 | | 6.34 |
| Acetyl chloride | 7.15 | | 7.13 | | 6.94 | | 5.89 |
| Terephthalyl chloride | 7.15 | | 7.19 | | 6.90 | | |

As shown in the above table, the sample containing no inhibiting agent was almost completely decomposed in 78 hours. The samples stabilized with benzohydroxamic acid or hydroxamic acid forming agents showed little deterioration after 702 hours (over 29 days) while the sample stabilized with the tetra-sodium salt of ethylene-diamine-tetra-acetic acid showed over 50% decomposition.

Generally, the choice of hydroxamic acid depends only on its solubility in aqueous solutions. Suitable alternatives to benzohydroxamic acid, which can be used in the same manner, are other aliphatic and aromatic hydroxamic acids, particularly alkyl and aryl hydroxamic acids, such as formohydroxamic acid, acetohydroxamic acid, propiohydroxamic acid and iso- and tere-phthalohydroxamic acids.

As shown in the example, and as previously stated, it is not necessary to add the hydroxamic acid in acid form. The addition of a substance capable of reacting with hydroxylamine in aqueous solution to form the hydroxamic acid will bring about stabilization of hydroxylamine.

The use of acetyl chloride and terephthalyl chloride in the example illustrate this aspect of the invention.

It is claimed:

1. Hydroxylamine in aqueous solution containing a small amount of a hydroxamic acid effective to inhibit oxidation deterioration of the hydroxylamine, said hydroxamic acid being selected from the group consisting of aliphatic and aromatic hydroxamic acids, and having about 1 to 10 carbon atoms and a molecular weight from about 61 to 200.

2. The hydroxylamine in aqueous solution of claim 1 wherein said hydroxamic acid is present in an amount of about 0.01 to 1 wt. percent based on the aqueous solution.

3. The hydroxylamine in aqueous solution of claim 1 wherein said hydroxamic acid is benzohydroxamic acid.

4. The hydroxylamine in aqueous solution of claim 3 wherein said benzohydroxamic acid is present in an amount of about 0.01 to 1 wt. percent based on the aqueous solution.

5. A method of stabilizing hydroxylamine in aqueous solution from oxidation deterioration which comprises adding thereto a small amount of a compound having about 1 to 10 carbon atoms selected from the group consisting of aliphatic and aromatic hydroxamic acids and their corresponding acyl chlorides, acyl esters, and acyl acid anhydrides which react with hydroxylamine in aqueous solution to form a hydroxamic acid, and aralkyl trihalo compounds which react with hydroxylamine in aqueous solution to form a hydroxamic acid.

6. The method of claim 5 wherein the compound having about 1 to 10 carbon atoms added thereto is an amount of about 0.01 to 1 wt. percent based on the aqueous solution.

7. The method of claim 6 wherein the compound added thereto is benzohydroxamic acid.

8. The method of claim 6 wherein the compound added thereto is acetyl chloride.

9. The method of claim 6 wherein the compound added thereto is terephthalyl chloride.

10. The method of claim 6 wherein the compound added thereto is acetic anhydride.

11. The method of claim 6 wherein the compound added thereto is benzoyl anhydride.

12. The method of claim 6 wherein the compound added thereto is methyl acetate.

13. The method of claim 6 wherein the compound added thereto is ethyl benzoate.

14. The method of claim 6 wherein the compound added thereto is benzotrichloride.

References Cited

UNITED STATES PATENTS

| 2,307,929 | 11/1943 | Joyce. | |
|---|---|---|---|
| 2,719,798 | 10/1955 | Jockers et al. | |
| 3,153,565 | 10/1964 | Dithmar et al. | 23—207.5 |

OSCAR R. VERTIZ, Primary Examiner

HOKE S. MILLER, Assistant Examiner

U.S. Cl. X.R.

252—380

PO-1050
(5/69)

UNITED STATES PATENT OFFICE
CERTIFICATE OF CORRECTION

Patent No. 3,480,392          Dated April 2, 1970

Inventor(s) Donald D. Carlos

It is certified that error appears in the above-identified patent and that said Letters Patent are hereby corrected as shown below:

References cited in Patent as "2,719,798", should read --2,719,778--.

SIGNED AND
SEALED
JUL 28 1970

(SEAL)
Attest:

Edward M. Fletcher, Jr.
Attesting Officer

WILLIAM E. SCHUYLER, JR.
Commissioner of Patents